(12) United States Patent
Kawahara et al.

(10) Patent No.: US 8,194,173 B2
(45) Date of Patent: Jun. 5, 2012

(54) AUTO-FOCUSING ELECTRONIC CAMERA THAT FOCUSES ON A CHARACTERIZED PORTION OF AN OBJECT

(75) Inventors: Takumi Kawahara, Ichikawa (JP); Yasuyuki Motoki, Kawasaki (JP); Akira Ohmura, Shibuya-ku (JP)

(73) Assignee: Nikon Corporation, Tokyo (JP)

( * ) Notice: Subject to any disclaimer, the term of this patent is extended or adjusted under 35 U.S.C. 154(b) by 679 days.

(21) Appl. No.: 11/172,964

(22) Filed: Jul. 5, 2005

(65) Prior Publication Data
US 2006/0012702 A1 Jan. 19, 2006

(30) Foreign Application Priority Data

Jul. 16, 2004 (JP) ................................. 2004-209671
Jul. 16, 2004 (JP) ................................. 2004-209673

(51) Int. Cl.
*G03B 13/00* (2006.01)
*H04N 5/232* (2006.01)
(52) U.S. Cl. ............................ 348/345; 348/362; 396/89
(58) Field of Classification Search .......... 348/345–356; 396/78–82, 88, 89, 93, 102, 107, 121, 150
See application file for complete search history.

(56) References Cited

U.S. PATENT DOCUMENTS

| | | | | |
|---|---|---|---|---|
| 6,249,317 | B1 * | 6/2001 | Hashimoto et al. | 348/364 |
| 6,341,169 | B1 * | 1/2002 | Cadorette et al. | 382/115 |
| 6,463,214 | B1 | 10/2002 | Nakata | |
| 6,999,684 | B2 * | 2/2006 | Sato et al. | 398/125 |
| 2002/0021897 | A1 | 2/2002 | Nakata | |
| 2002/0093577 | A1 * | 7/2002 | Kitawaki et al. | 348/241 |
| 2003/0071908 | A1 * | 4/2003 | Sannoh et al. | 348/345 |
| 2003/0071911 | A1 * | 4/2003 | Shinohara et al. | 348/370 |
| 2003/0133600 | A1 * | 7/2003 | Huang et al. | 382/118 |
| 2005/0013601 | A1 * | 1/2005 | Ide et al. | 396/121 |
| 2007/0263909 | A1 | 11/2007 | Ojima et al. | |
| 2007/0263933 | A1 | 11/2007 | Ojima et al. | |
| 2007/0263934 | A1 | 11/2007 | Ojima et al. | |
| 2007/0263935 | A1 | 11/2007 | Sanno et al. | |
| 2007/0268370 | A1 | 11/2007 | Sanno et al. | |

FOREIGN PATENT DOCUMENTS

| | | |
|---|---|---|
| JP | A-2001-000819 | 1/2001 |
| JP | A-2001-008191 | 1/2001 |
| JP | 2003230049 A * | 8/2003 |

OTHER PUBLICATIONS

Machine Translation of JP 2003-230049 A (JP publication Aug. 15, 2003).*

* cited by examiner

*Primary Examiner* — Nelson D. Hernández Hernández
(74) *Attorney, Agent, or Firm* — Oliff & Berridge, PLC

(57) ABSTRACT

An electronic camera includes a menu providing section that provides a focus area selection menu that allows a user to select a focus area, a characterizing portion detecting section that detects a characterizing portion of an object, and an area setting section that sets a focus area based on the characterizing portion detected by the characterizing portion detecting section. The focus area selection menu that is provided by the menu providing section to the user includes, as a selection item, a focus area to be set by the area setting section.

4 Claims, 7 Drawing Sheets

AUTO-FOCUSING ELECTRONIC CAMERA THAT FOCUSES ON A CHARACTERIZED PORTION OF AN OBJECT

CROSS-REFERENCE TO RELATED APPLICATION

This application is based upon and claims the benefit of priority from Japanese Patent Application Nos. 2004-209671 and 2004-209673, both filed on Jul. 16, 2004, the entire contents of which are incorporated herein by reference.

BACKGROUND OF THE INVENTION

1. Field of the Invention

The present invention relates to an electronic camera for shooting an object. In particular, the invention relates to an electronic camera capable of detecting a characterizing portion of an object such as face detection.

2. Description of the Related Art

Cameras have been proposed where the camera detects the face portion of a person in the field shot by the camera and the camera auto-focuses on the detected face portion in order to focus on the face portion of a person when the object is a person. However, face detection is associated with problems that depending on the face detection method or the environment, the face cannot be detected, the detection accuracy is low, or some other trouble occurs.

SUMMARY OF THE INVENTION

The present invention has been made to solve the above problems in prior art, and an object of the invention is to increase the accuracy in electronic cameras to detect the characterizing portion of objects such as the face.

The invention will be summarized below.

An electronic camera according to a first aspect of the invention includes a menu providing section that provides a focus area selection menu that allows a user to select a focus area, a characterizing portion detecting section that detects a characterizing portion of an object, and an area setting section that sets a focus area based on the characterizing portion detected by the characterizing portion detecting section, in which the focus area selection menu that is provided by the menu providing section to the user includes, as a selection item, a focus area to be set by the area setting section.

In the first aspect, it is preferable that the characterizing portion detecting section be able to detect a human face as the characterizing portion. In this case, in particular, it is even preferable that the menu providing section provides, as focus area selection items, a central area of field and an area including a face-detection portion.

An electronic camera according to a second aspect of the invention includes a characterizing portion detecting section that detects a characterizing portion of an object, and a focusing section that focuses the electronic camera based on the characterizing portion detected by the characterizing portion detecting section, wherein if no characterizing portion has been detected by the characterizing portion detecting section in shooting a recording image, the focusing section drives so that a focus position is moved to a prescribed position.

In the second aspect, it is preferable that the characterizing portion detecting section be able to detect a human face as the characterizing portion.

In the second aspect, it is preferable that the focusing section drives so that the focus position is moved to a close-range side.

In the second aspect, it is preferable that the focusing section moves the focus position each time by a prescribed length. In this case, in particular, it is even preferable that the focusing section moves the focus position each time by a minimum movement length that is possible in manual focusing. Alternatively, in particular, it is even preferable that the focusing section stops driving the focus position when the characterizing portion detecting section has detected a characterizing portion.

An electronic camera according to a third aspect of the invention includes a field preview image generating section that generates a field preview image based on an output of an image sensor, a display section that displays the field preview image generated by the field preview image generating section, and a characterizing portion detecting section that detects a characterizing portion of an object, wherein the field preview image generating section generates a field preview image by a control that varies depending on an operation state of the characterizing portion detecting section.

In the third aspect, it is preferable that the characterizing portion detecting section is able to detect a human face as the characterizing portion.

In the third aspect, it is preferable that the field preview image generating section generates a field preview image that conforms to a detecting characteristic of the characterizing portion detecting section, while the characterizing portion detecting section is in operation.

In the third aspect, it is preferable that the field preview image generating section generates a field preview image that is higher in luminance while the characterizing portion detecting section is in operation than while the characterizing portion detecting section is not in operation.

In the third aspect, it is preferable that the electronic camera further includes an aperture controlling section that controls an aperture, and the aperture controlling section controls the aperture so that a depth of field is greater while the characterizing portion detecting section is in operation than while the characterizing portion detecting section is not in operation.

In the third aspect, it is preferable that the electronic camera further include a zoom lens driving section capable of zooming, and the zoom lens driving section zooms closer to a wide-angle side while the characterizing portion detecting section is in operation than while the characterizing portion detecting section is not in operation.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

An embodiment of the present invention will be hereinafter described with reference to the drawings.

First, a description will be made of the configuration of an electronic camera 1 according to the embodiment of the invention.

Figure 1:
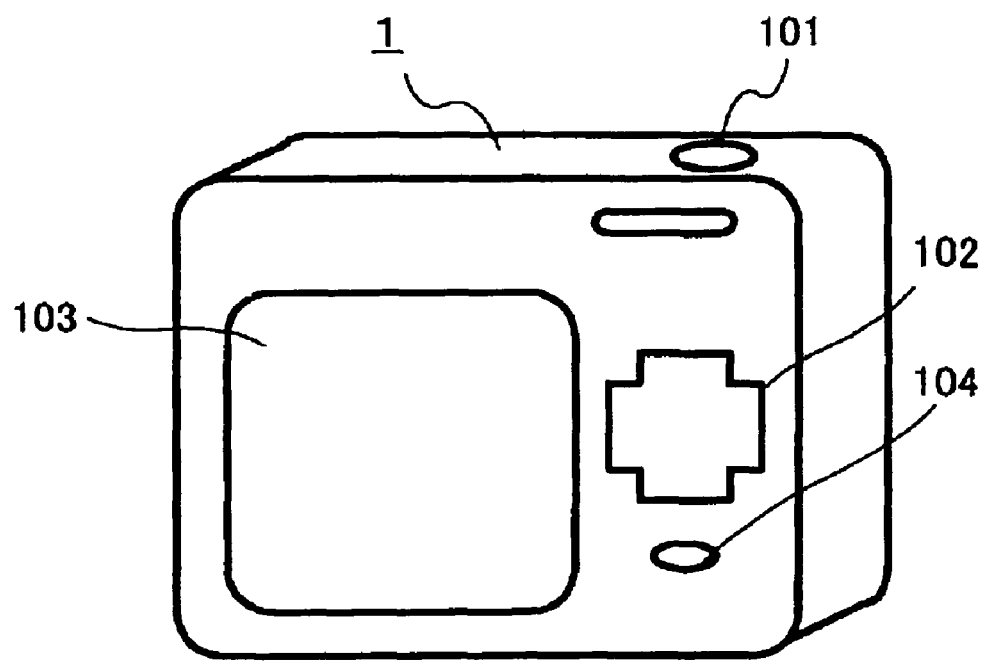
FIG. 1 shows an appearance of an electronic camera according to an embodiment of the present invention.

FIG. 1 shows an appearance of the electronic camera 1 according to the embodiment of the invention. As shown in FIG. 1, the electronic camera 1 is equipped with a shutter release button 101, a cruciform key 102, a monitor 103, and a decision button 104.

The shutter release button 101 is a button which can detect manipulation in two stages, that is, a half-depression stage and a full-depression stage. The shutter release button 101 is manipulated by a user to make an instruction to start photographing. The cruciform key 102 is manipulated to move a cursor or the like on the monitor 103. The decision button 104 is manipulated to decide on a selected item or the like. The decision button 104 is also manipulated to switch the monitor 103 between a lighted state and a non-lighted state.

Figure 2:
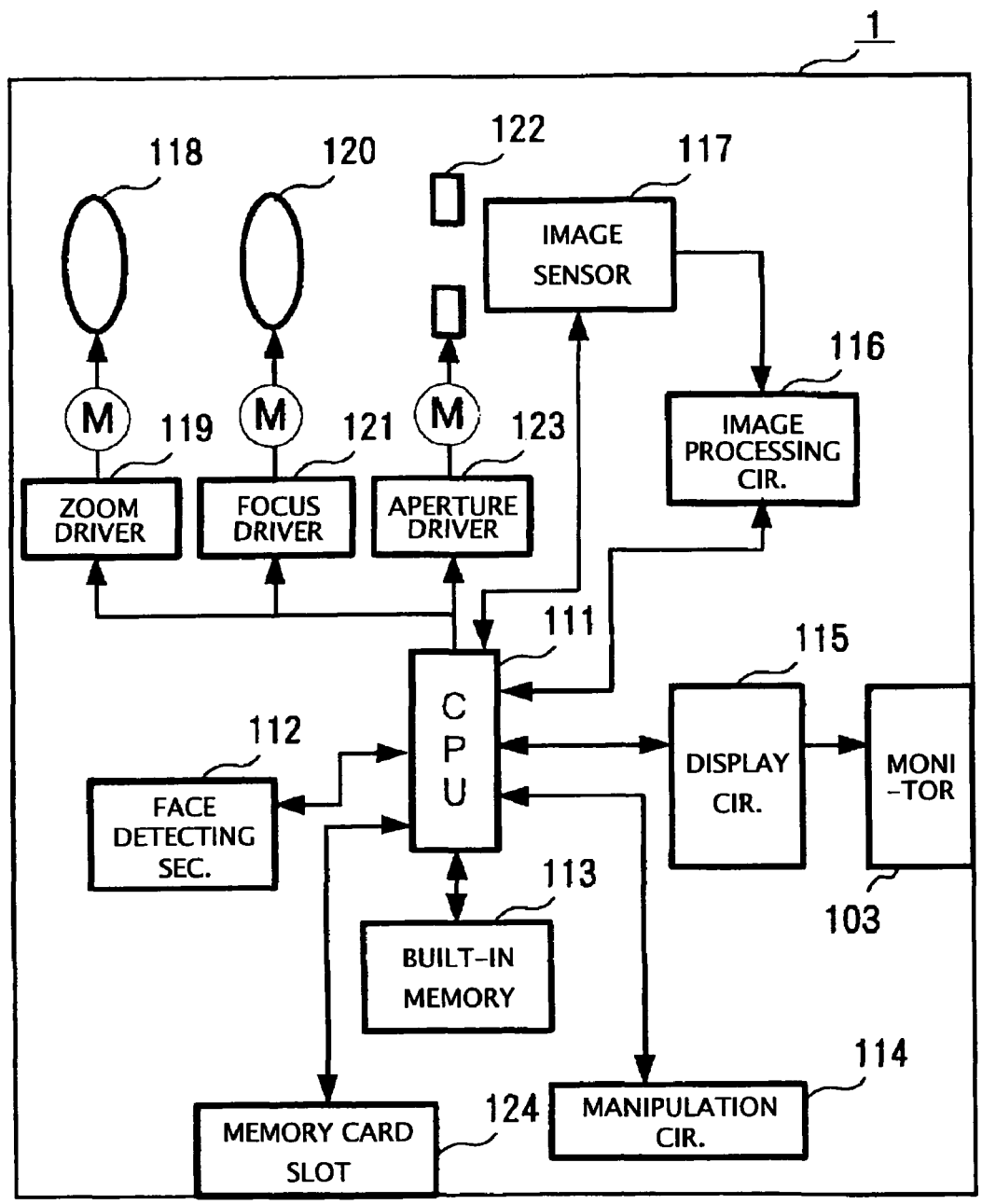
FIG. 2 is a block diagram showing functions of the electronic camera according to the embodiment of the invention.

FIG. 2 is a block diagram showing functions of the electronic camera 1 according to the embodiment of the invention. As shown in FIG. 2, the electronic camera 1 is composed of a CPU 111, a face detecting section 112, a built-in memory 113, a manipulation circuit 114, a display circuit 115, the monitor 103, an image processing circuit 116, an image sensor 117, a zoom lens 118, a zoom driver 119, a focus lens 120, a focus driver 121, an aperture 122, an aperture driver 123, and a memory card slot 124. Naturally, there are other circuits for realizing functions of the electronic camera 1, however, they will not be described because their relevance to the invention is low.

The CPU 111 is a circuit that runs programs for realizing various functions of the electronic camera 1. The CPU 111 controls various circuits in the electronic camera 1 by running programs stored in the memory in the CPU 111 and the built-in memory 113. The face detecting section 112 extracts a characterizing portion from image data produced by the image sensor 117 and detects a face area of an object, a face size, etc. Although the function block "face detecting section 112" is used for convenience of description, this embodiment realizes the face detection function by software, that is, by the CPU 111's running a face detection program. Alternatively, the face detection function may be implemented by constructing a hardware circuit.

The built-in memory 113 is a memory for storing image data, control programs, etc., and is a nonvolatile semiconductor memory, for example. The face detection program run to detect a face area of an object is stored in the built-in memory 113. The built-in memory 113 can store face information such as a face position and a face size obtained by face detection. The manipulation circuit 114 is a circuit for detecting a manipulation performed on the manipulation buttons such as the shutter release button 101, the cruciform key 102, and the decision button 104 provided in the electronic camera 1 and informing the CPU 111 of the detected manipulation. The manipulation circuit 114 also detects a half depression or a full depression of the shutter release button 101. The display circuit 115 is a circuit for generating screen data to be displayed on the monitor 103. The monitor 103, which is a liquid crystal display provided in the back surface of the electronic camera 1, displays screen data generated by the display circuit 115.

An objective lens is an optical lens for forming an object image on the light-receiving surface of the image sensor 117 and composed of the zoom lens 118, the focus lens 120, etc. Among the lenses constituting the objective lens, the zoom lens 118 is a lens that is moved by a motor to enlarge or reduce an optical image formed on the image sensor 117. The zoom driver 119 is a circuit for moving the zoom lens 118 to a proper position by driving the motor according to an instruction from the CPU 111. Among the lenses constituting the objective lens, the focus lens 120 is a lens that is moved by a motor to attain focusing. The focus driver 121 is a circuit for moving the focus lens 120 to a proper position by driving the motor according to an instruction from the CPU 111.

The aperture 122 is to adjust the quantity of light that is input from a field to the image sensor 117. The aperture driver 123 is a circuit for controlling the degree of opening of the aperture 122 by driving a motor according to an instruction from the CPU 111. The image sensor 117 is a device such as a CCD for converting an optical image that is input through the objective lens to an electrical image signal. The image processing circuit 116 generates a digital signal by A/D-converting an electrical signal that is output from the image sensor 117. The image processing circuit 116 generates image data by performing interpolation processing etc. on the thus-generated digital signal. The memory card slot 124 is a slot into which a memory card is to be inserted. Data such as image data are written to or erased from the inserted memory card.

Next, the operation of the electronic camera 1 according to the embodiment of the invention will be described.

Setting manipulations for using the face detection function of the electronic camera 1 will be described below. Where the main object is a person, a user of a camera wants to focus the camera on a face portion detected by face detection. In the electronic camera 1, results of face detection are used as one of choices to determine the area to be auto-focused. That is, the electronic camera 1 is provided with the face detection as one of auto-focus area selection items from which a user can select.

Figure 3:
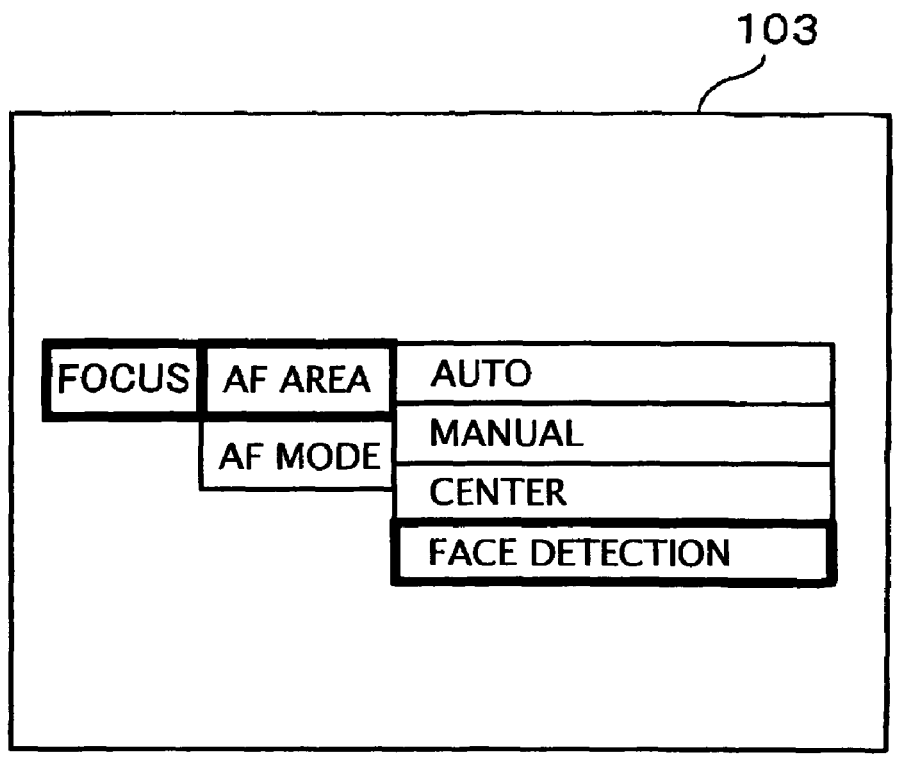
FIG. 3 shows a focus-related menu picture that is displayed on a monitor of the electronic camera.
Figure 4:
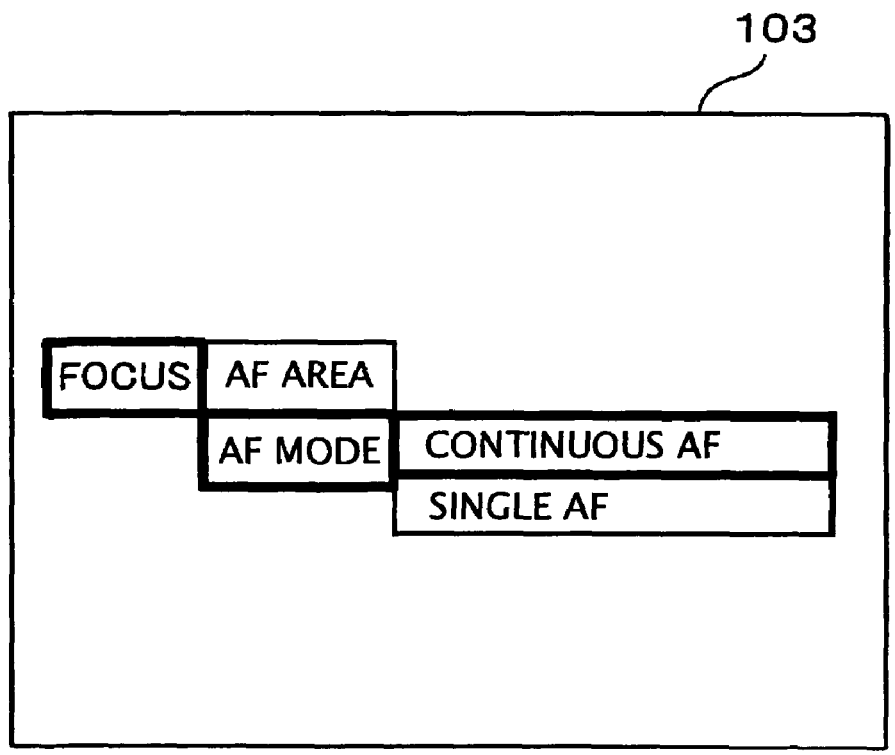
FIG. 4 shows another focus-related menu picture that is displayed on the monitor of the electronic camera.

FIGS. 3 and 4 show focus-related menu pictures that are displayed on the monitor 103 of the electronic camera 1.

FIG. 3 shows a picture that is displayed in setting "AF area" among the selection items in the menu picture. For the selection item "AF area," a selection can be made from "auto," "manual," "center," and "face detection." If "auto" is selected, all auto-focus areas are used and control is performed so that the electronic camera 1 is focused on an object closest to the electronic camera 1 among objects each of which overlaps with one of the auto-focus areas. If "manual" is selected, control is performed so that the electronic camera 1 is focused by using only an auto-focus area selected by a user from plural auto-focus areas. If "center" is selected, control is performed so that the electronic camera 1 is focused by using only the central auto-focus area among plural auto-focus areas. If "face detection" is selected, control is performed so that the electronic camera 1 is focused on a closest face portion among detected face portions.

FIG. 4 shows a picture that is displayed in setting "AF mode" among the selection items in the menu picture. For the selection item "AF mode," one of "continuous AF" and "single AF" can be chosen. However, if "face detection" is selected, switching is made automatically to "continuous AF." If "continuous AF" is chosen, control is performed so that auto-focusing is performed repeatedly irrespective of manipulation on the shutter release button 101 and that auto-focus locking is effected upon a half depression of the shutter release button 101. If "single AF" is selected, control is performed so that auto-focusing is performed only while the shutter release button 101 is half depressed and that auto-focus locking is effected upon completion of the focusing.

An item in the menu can be selected or decided on by the user's manipulating the cruciform key 102 or the decision button 104.

Next, the face detection operation of the electronic camera 1 according to the embodiment of the invention will be described.

The electronic camera 1 starts a face detection control when switching is made to a still image photographing mode that enables still image photographing in a state that "face detection" is selected in the menu picture of FIG. 3. In the electronic camera 1, face detection is performed by using a moving image that is taken by the image sensor 117 and displayed on the monitor 103 to check an object image to be photographed actually. In the electronic camera 1, control is performed so that the luminance of a moving image is made higher while face detection is performed than while face detection is not performed. Increasing the luminance of a moving image facilitates face detection.

In the electronic camera 1, face detection is performed repeatedly by using moving images until a half depression of the shutter release button 101. If no face is detected by this attempt, as assistance to the face detection, the electronic camera 1 is focused on an object by performing central-area auto-focusing and multi-area auto-focusing.

In the electronic camera 1, one latest set of pieces of face detection information such as a face position and face size as face detection results repeatedly overwrites the old one in the built-in memory 113 until a half depression of the shutter release button 101. This makes it possible to read and utilize previous detection results stored in the built-in memory 113 even if no face is detected at the time of a half depression. If no face detection information is available at the time of a half depression, auto-focusing using another area such as a central area is performed forcibly.

A photographing control with the face detection will be described below in a specific manner with reference to a flowchart.

Figure 5:
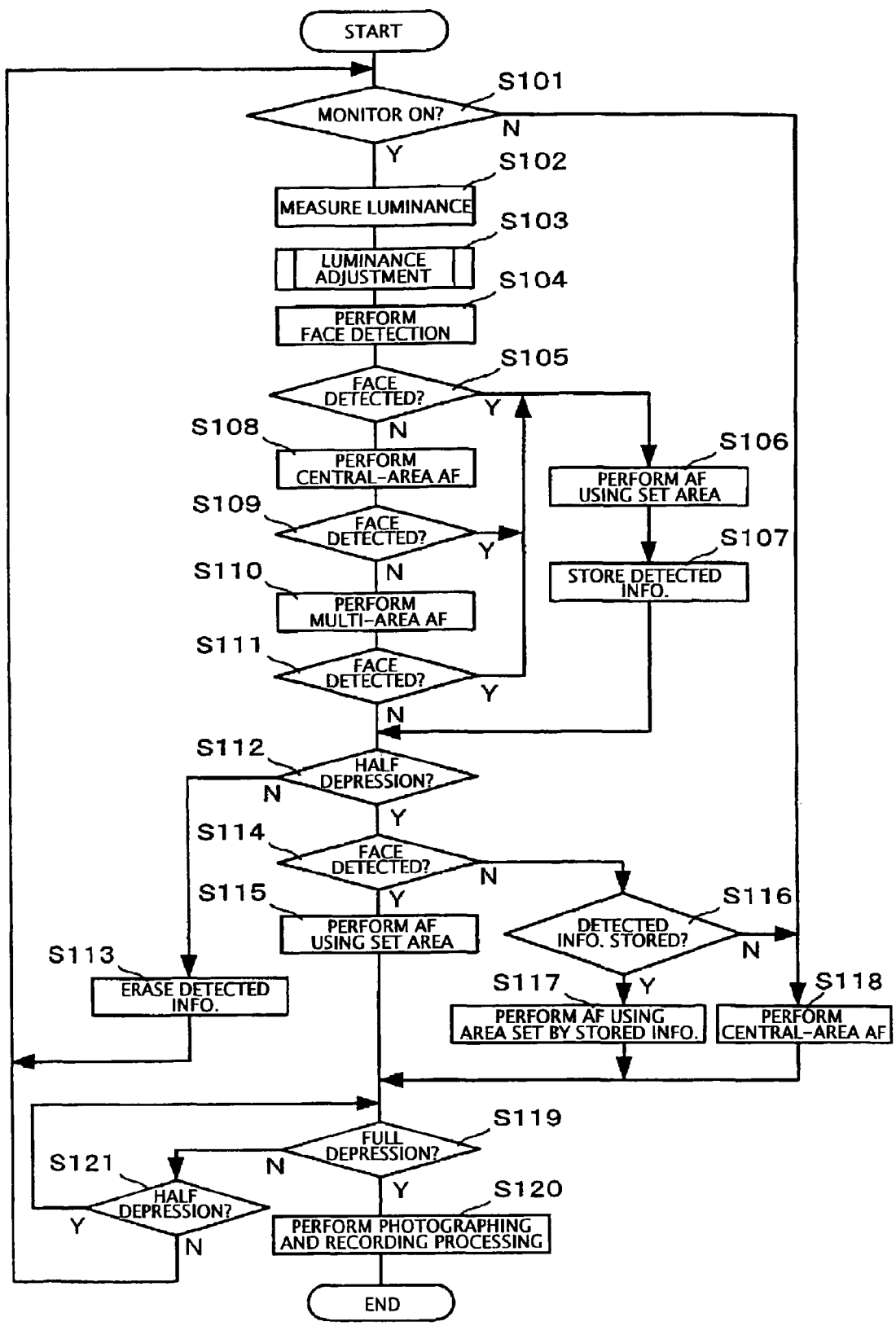
FIG. 5 is a flowchart showing a control that is performed by a CPU.

FIG. 5 is a flowchart showing a control performed by the CPU 111, which is started when "face detection" is selected in the menu picture of FIG. 3 and the still image photographing mode is set.

First, at step S101, it is judged whether the monitor 103 is in a lighted state. The process moves to step S102 if the monitor 103 is in a lighted state, and moves to step S118 if the monitor 103 is not in a lighted state. If the monitor 103 is not in a lighted state, a user cannot check face detection results and hence it is probable that erroneous face detection has occurred. In the electronic camera 1, if it is in a state that a user cannot check face detection results, an auto-focus area setting made of face detection is invalidated. In the electronic camera 1, if the monitor 103 is not in a lighted state, face detection is not performed by making such a control as not to output a moving image.

At step S102, field luminance is measured by using an image taken by the image sensor 117. Then, at step S103, a luminance adjustment is performed on the basis of the measured field luminance and a moving image is displayed on the monitor 103. Further, processing of increasing the depth of field is performed. The processing performed at this step will be described later with reference to FIG. 8.

Figure 6:
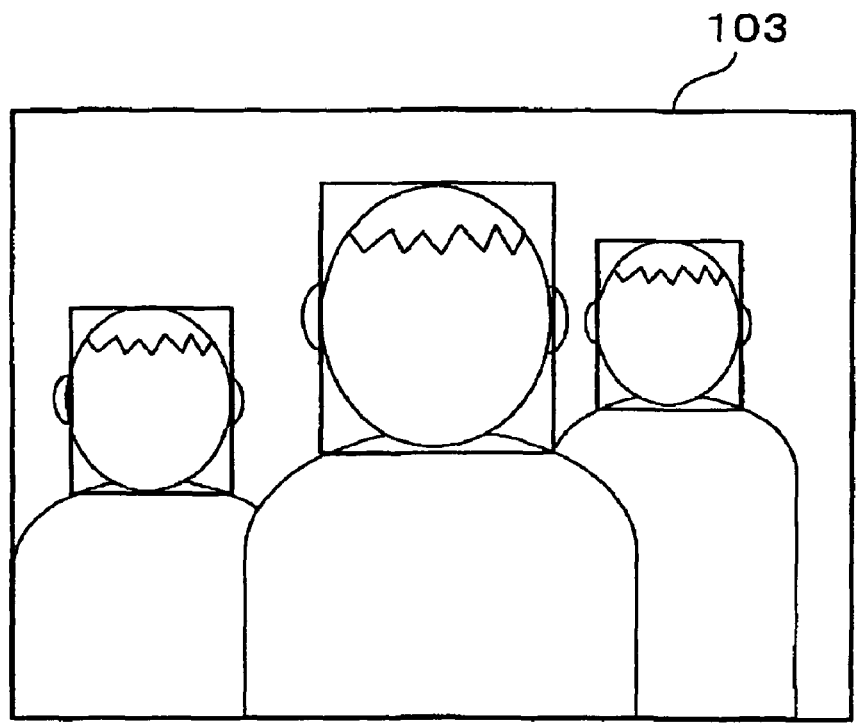
FIG. 6 shows an exemplary picture that is displayed on the monitor of the electronic camera in a face detection control.

At step S104, face detection is performed by using the moving image. Then, at step S105, it is judged whether a face has been detected. The process moves to step S106 if a face has been detected, and moves to step S108 if no face has been detected. At step S106, an area is set on the basis of a position and a size of the detected face and auto-focusing is performed by using the area thus set. FIG. 6 shows an exemplary picture that is displayed on the monitor 103 when a face has been detected. Then, at step S107, the detected face information is stored in the built-in memory 113 (for temporary storage). Storing the face information at this stage makes it possible to determine an auto-focus area using face information stored in the built-in memory 113 even if no face is detected at the time of a half depression when an auto-focus area should be determined finally. At the time of the next face detection, new face information overwrites the face information stored in the built-in memory 113.

At step S108, auto-focusing is performed by using a central area as an auto-focus area. It is probable that no face is detected though a person exists in the field because a face image taken is too blurred. In view of this, to assist the face detection, the electronic camera 1 is focused on an object in a central region where a main object would exist at a high probability. At step S109, it is judged again whether a face has been detected. The process moves to step S110 if no face has been detected, and moves to step S106 if a face has been detected. At step S110, multi-area focusing is performed. This makes it possible to detect a face when a person exists in a region other than a central region.

At step S111, it is judged again whether a face has been detected. The process moves to step S112 if no face has been detected, and moves to step S106 if a face has been detected. At step S112, it is judged whether a half depression of the shutter release button 101 has been detected. The process moves to step S114 if a half depression has been detected, and moves to step S113 if a half depression has not been detected. At step S113, the face information stored in the built-in memory 113 is erased. And the process returns to step S101.

Figure 7:
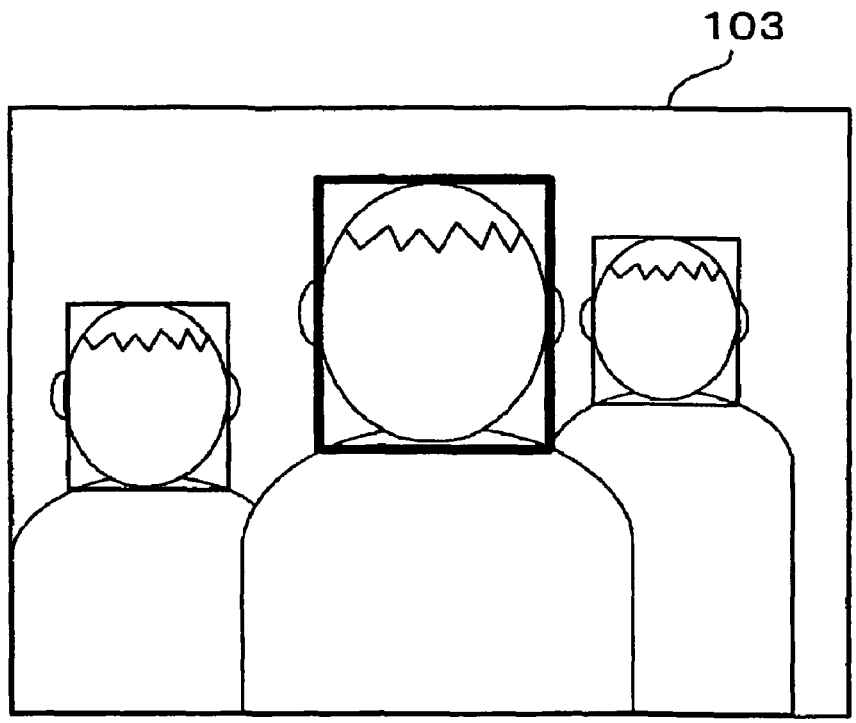
FIG. 7 shows another exemplary picture that is displayed on the monitor of the electronic camera in the face detection control.

At step S114, to determine a face to be used for setting a final auto-focus area, it is judged whether a face has been detected. The process moves to step S115 if a face has been detected, and moves to step S116 if no face has been detected. At step S115, an area that is set on the basis of a position and a size of the detected face is employed as a final auto-focus area and an auto-focus control is performed. FIG. 7 shows an exemplary picture that is displayed on the monitor 103 at this step. At step S116, it is judged whether face information (stored at step S107) exists in the built-in memory 113. The process moves to step S117 if face information exists in the built-in memory 113, and moves to step S118 if face information does not exist in the built-in memory 113.

At step S117, an auto-focus area is set on the basis of the stored face information and auto-focusing is performed. This makes it possible to focus the electronic camera 1 on a face portion almost without fail because a face that was detected immediately before (i.e., with a short time difference) is used for setting an auto-focus area, even if no face is detected at the time of a half depression. In particular, this makes it possible to accommodate a one-stroke depression in which the shutter release button 101 is fully depressed in one stroke. At step S118, auto-focusing is performed by using a central area as an auto-focus area. With this measure, even when no face is detected, the electronic camera 1 can be focused on a main object at a high probability because the central area where a main object would exist at a high probability is automatically used as an auto-focus area. In addition, a photo opportunity is not missed because it is not necessary to return to a menu picture to set an auto-focus area again.

At step S119, it is judged whether a full depression of the shutter release button 101 has been detected. The process moves to step S120 if a full depression has been detected, and moves to step S121 if a full depression has not been detected. At step S120, photographing and recording processing are performed. At step S121, it is judged whether a half depression of the shutter release button 101 has been detected. The process returns to step S119 if a half depression has been detected, and moves to step S101 if a half depression has not been detected.

FIGS. 6 and 7 show exemplary pictures that are displayed on the monitor 103 of the electronic camera 1 in a face detection control. A manner of monitor display in a face detection control will be described below with reference to FIGS. 6 and 7. FIGS. 6 and 7 show exemplary pictures that are displayed before and after a half depression of the shutter release button 101, respectively. As shown in FIGS. 6 and 7, a frame that is set on the basis of a position and a size of a detected face and indicates an auto-focus area is displayed so as to be superimposed on a moving image. Where plural faces have been detected, frames are displayed for the respective faces. Upon a half depression, the frame of a face that is largest or closest among the faces detected at that time point is switched from a yellow frame (indicated by a thin line in FIG. 6) to a red frame (indicated by a thick line in FIG. 7). The red-frame area in FIG. 7 is set as an auto-focus area to be used at the time of a full depression.

Next, the luminance adjustment that is performed at step S103 will be described.

The processing performed at this step is intended for increase in the accuracy of detection of a face portion. Control is performed so that the luminance of an image to be used for face detection is adjusted to luminance that facilitates face detection by a face detection program (the proper luminance depends on the detection algorithm of the face detection program). The electronic camera 1 according to the embodiment employs a face detection program that can detect a face more easily when the luminance is made higher than in ordinary photographing.

The probability of success of face detection becomes higher as the depth of field increases. Therefore, control is performed so that the depth of field is made greater than in the case of producing an ordinary moving image. Where face detection is selected, an operation of setting the aperture as narrow as possible or moving the zoom lens to the wide-angle side is performed. Naturally, it is not necessary to increase the depth of field beyond a predetermined depth. Control may be made so that the depth of field is increased gradually when a face cannot be detected.

Figure 8:
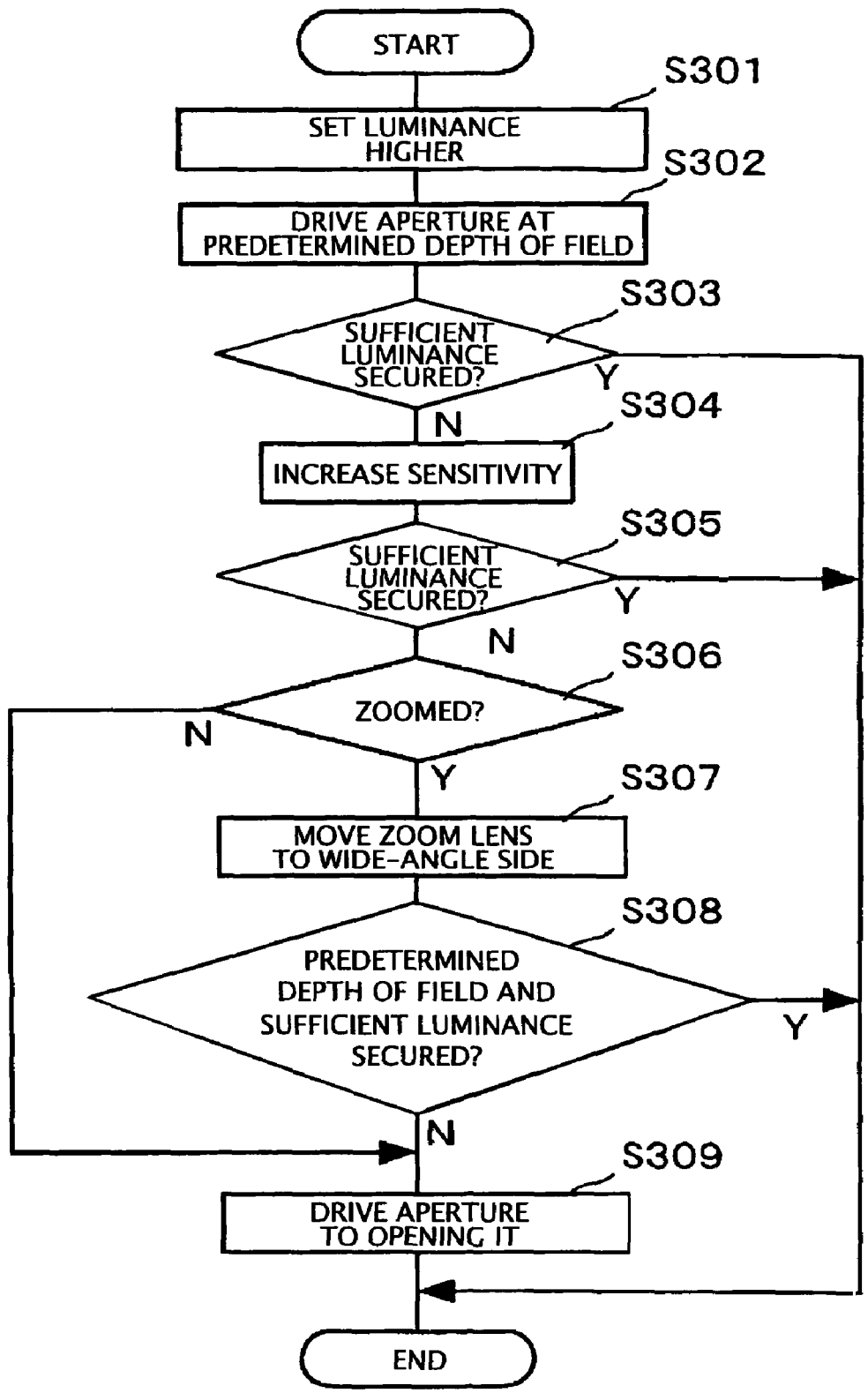
FIG. 8 is a flowchart showing a control that is performed at step S103 in FIG. 5.

A specific control will be described below with reference to FIG. 8. FIG. 8 is a flowchart showing a control that is performed at step S103 in FIG. 5.

First, at step S301, the luminance is set higher than proper luminance that is employed in producing an ordinary moving image. Then, at step S302, the aperture 122 is driven so that a predetermined depth of field is obtained. At step S303, it is judged whether sufficient luminance is secured by the current state of the aperture 122. The process is finished if sufficient luminance is secured, and moves to step S304 if sufficient luminance is not secured. At step S304, the image processing circuit 116 is caused to perform processing of increasing the moving image sensitivity. At step S305, it is judged again whether sufficient luminance is secured. The process is finished if sufficient luminance is secured, and moves to step S306 if sufficient luminance is not secured.

At step S306, it is judged whether the zoom lens 118 is in a zooming state. The process moves to step S307 if the zoom lens 118 is in a zooming state, and moves to step S309 if the zoom lens 118 is not in a zooming state. At step S307, the zoom lens 118 is moved to the wide-angle side. Then, at step S308, it is judged whether the predetermined depth of field and sufficient luminance are secured. The process is finished if they are secured, and moves to step S309 if they are not secured. At step S309, sufficient luminance is secured by driving the aperture 122 in the direction of opening it.

Next, another face detection control performed by the electronic camera 1 will be described (another embodiment).

In the control of FIG. 5, if no face has been detected, central-area auto-focusing and multi-area auto-focusing are performed as assistance to the face detection.

In contrast, in the control of this embodiment, when no face has been detected, the focus lens 120 is moved to a predetermined position instead of performing auto-focusing. For example, first, the focus lens 120 is moved to the close-range side. This is to give priority to a closest face. Then, the focus lens 120 is moved from the close-range side by a predetermined movement length (movement step) each time until a face is detected. The lens driving is stopped when a face is detected.

The movement step of the focus lens 120 is set equal to a minimum movement step that is possible in manual focusing.

Figure 9:
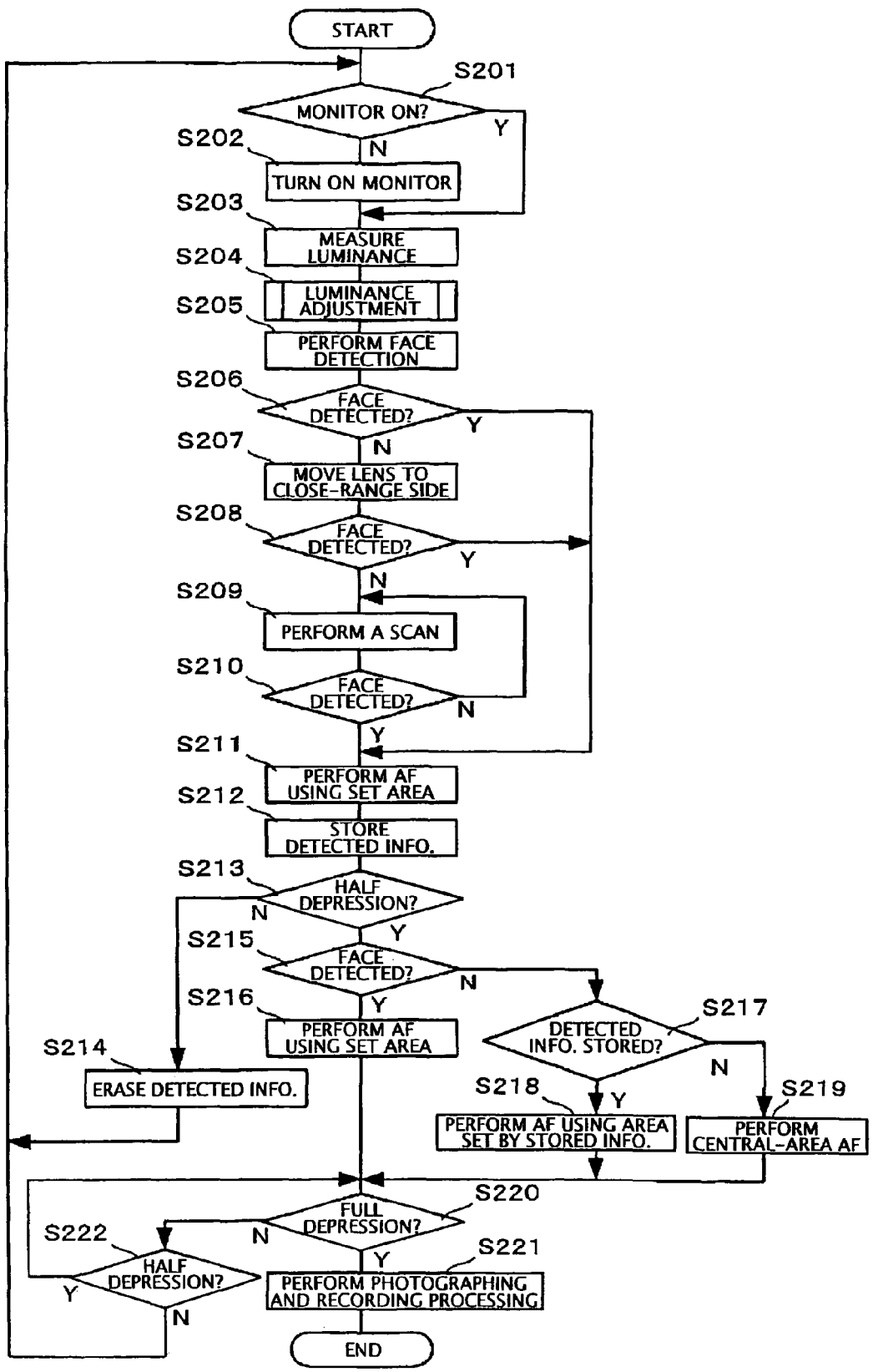
FIG. 9 is a flowchart showing another control that is performed by the CPU.

An exemplary control according to this embodiment performed by the electronic camera 1 will be described below in a specific manner with reference to FIG. 9. FIG. 9 is a flowchart showing a control performed by the CPU 111, which is started when "face detection" is selected in the menu picture of FIG. 3 and the still-image photographing mode is set.

First, at step S201, it is judged whether the monitor 103 is in a lighted state. The process moves to step S203 if the monitor 103 is in a lighted state, and moves to step S202 if the monitor 103 is not in a lighted state. If the monitor 103 is not in a lighted state, a user cannot check face detection results. Therefore, at step S202, the monitor 103 is lit forcibly.

At step S203, field luminance is measured by using an image taken by the image sensor 117. Then, at step S204, a luminance adjustment is performed on the basis of the measured field luminance and a moving image is displayed on the monitor 103. Further, processing of increasing the depth of field is performed. The processing performed at this step was described above with reference to the flowchart of FIG. 8.

At step S205, face detection is performed by using the moving image. Then, at step S206, it is judged whether a face has been detected. The process moves to step S211 if a face has been detected, and moves to step S207 if no face has been detected. At step S207, the focus lens 120 is moved to the close-range side. At step S208, it is judged again whether a face has been detected. The process moves to step S211 if a face has been detected, and moves to step S209 if no face has been detected. At step S209, the focus lens 120 is moved by a predetermined movement step. At step S210, it is judged again whether a face has been detected. The process moves to step S211 if a face has been detected, and moves to step S209 if no face has been detected.

At step S211, an area is set on the basis of a position and a size of the detected face and auto-focusing is performed by using the area thus set. FIG. 6 shows an exemplary picture that is displayed on the monitor 103 when a face has been detected. Then, at step S212, the detected face information is stored in the built-in memory 113 (for temporary storage). Storing the face information at this stage makes it possible to determine an auto-focus area using face information stored in the built-in memory 113 even if no face is detected at the time of a half depression when an auto-focus area should be determined finally. At the time of the next face detection, new face information overwrites the face information stored in the built-in memory 113.

At step S213, it is judged whether a half depression of the shutter release button 101 has been detected. The process moves to step S215 if a half depression has been detected, and moves to step S214 if a half depression has not been detected. At step S214, the face information stored in the built-in memory 113 is erased. And the process returns to step S201.

At step S215, to determine a face to be used for setting a final auto-focus area, it is judged whether a face has been detected. The process moves to step S216 if a face has been detected, and moves to step S217 if no face has been detected. At step S216, an area that is set on the basis of a position and a size of the detected face is employed as a final auto-focus area and an auto-focus control is performed. FIG. 7 shows an exemplary picture that is displayed on the monitor 103 at this step. At step S217, it is judged whether face information (stored at step S212) exists in the built-in memory 113. The process moves to step S218 if face information exists in the built-in memory 113, and moves to step S219 if face information does not exist in the built-in memory 113.

At step S218, an auto-focus area is set on the basis of the stored face information and auto-focusing is performed. This makes it possible to focus the electronic camera 1 on a face portion almost without fail because a face that was detected immediately before (i.e., with a short time difference) is used for setting an auto-focus area, even if no face is detected at the time of a half depression. In particular, this makes it possible to accommodate a one-stroke depression in which the shutter release button 101 is fully depressed in one stroke. At step S219, auto-focusing is performed by using a central area as an auto-focus area. With this measure, even when no face is detected, the electronic camera 1 can be focused on a main object at a high probability because the central area where a main object would exist at a high probability is automatically used as an auto-focus area. In addition, a photo opportunity is not missed because it is not necessary to return to a menu picture to set an auto-focus area again.

At step S220, it is judged whether a full depression of the shutter release button 101 has been detected. The process moves to step S221 if a full depression has been detected, and moves to step S222 if a full depression has not been detected. At step S221, photographing and recording processing are performed. At step S222, it is judged whether a half depression of the shutter release button 101 has been detected. The process returns to step S220 if a half depression has been detected, and moves to step S201 if a half depression has not been detected.

The accuracy of the face detection can be increased by performed the above-described control.

To facilitate understanding of the invention, the advantages of the above-described embodiments will be described below in general terms.

In the electronic cameras according to the embodiments, a focus area that is set on the basis of a characterizing portion to be detected by the characterizing portion detecting section can be selected as one of the focus area selection items in the focus area selection menu. This allows a user to select a focus area without confusion.

In the electronic cameras according to the embodiments, a field preview image is generated by the control that varies depending on the operation state of the characterizing portion detecting section. This makes it possible to increase the accuracy of detection of a characterizing portion by the characterizing portion detecting section.

The invention is not limited to the above embodiments and various modifications may be made without departing from the spirit and scope of the invention. Any improvement may be made in part or all of the components.

What is claimed is:

1. An electronic camera comprising:
   an image generating section that generates an image based on an output of an image sensor;
   a characterizing portion detecting section that detects a characterizing portion of an object;
   an area setting section that sets a focus area of the image generated by said image generating section;
   a focus control section that performs a focus control in said focus area set by said area setting section; and
   a storing control section that stores an area of said characterizing portion detected by said characterizing portion detecting section in a storing section, wherein
   said characterizing portion detecting section repeatedly detects said characterizing portion when performing of a detection of said characterizing portion is selected on a menu picture and a monitor is lighted,
   said focus control section performs said focus control using each said area of said characterizing portion being repeatedly detected by said characterizing portion detecting section,
   said storing control section sequentially stores said area of said characterizing portion being repeatedly detected by said characterizing portion detecting section in said storing section,
   said area setting section sets, as said focus area, the area of said characterizing portion being stored in said storing section before a half depression of a shutter release button when said characterizing portion is not detected by said characterizing portion detecting section after the half depression of the shutter release button, and
   said area setting section sets a central area of said focus area when said monitor is off.

2. The electronic camera according to claim 1, wherein said area setting section automatically sets said focus area in a predetermined area when said characterizing portion is not detected by the characterizing portion detecting section.

3. The electronic camera according to claim 1, wherein said characterizing portion detecting section detects a human face as said characterizing portion.

4. The electronic camera according to claim 1, wherein said area setting section sets the central area as said focus area when said characterizing portion is not detected by the characterizing portion detecting section.

* * * * *